(12) United States Patent
Nagata et al.

(10) Patent No.: US 9,369,897 B2
(45) Date of Patent: Jun. 14, 2016

(54) RADIO COMMUNICATION SYSTEM, RADIO BASE STATION APPARATUS, USER TERMINAL AND RADIO COMMUNICATION METHOD

(71) Applicant: NTT DOCOMO, INC., Tokyo (JP)

(72) Inventors: Satoshi Nagata, Tokyo (JP); Tetsushi Abe, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 133 days.

(21) Appl. No.: 14/346,406

(22) PCT Filed: Oct. 1, 2012

(86) PCT No.: PCT/JP2012/075395
§ 371 (c)(1),
(2) Date: Mar. 21, 2014

(87) PCT Pub. No.: WO2013/054683
PCT Pub. Date: Apr. 18, 2013

(65) Prior Publication Data
US 2014/0226519 A1 Aug. 14, 2014

(30) Foreign Application Priority Data

Oct. 14, 2011 (JP) .................................. 2011-226733

(51) Int. Cl.
*H04Q 7/00* (2006.01)
*H04W 24/08* (2009.01)
(Continued)

(52) U.S. Cl.
CPC ............... *H04W 24/08* (2013.01); *H04B 7/024* (2013.01); *H04B 7/0632* (2013.01); *H04B 7/0639* (2013.01); *H04J 11/0053* (2013.01); *H04W 72/1226* (2013.01)

(58) Field of Classification Search
None
See application file for complete search history.

(56) References Cited

U.S. PATENT DOCUMENTS 8,301,182 B2   10/2012   Kim et al.
2012/0076038 A1*  3/2012   Shan .................... H04B 7/026
                                                              370/252

(Continued)

FOREIGN PATENT DOCUMENTS

WO    2010/064835 A2    6/2010

OTHER PUBLICATIONS

International Search Report for corresponding International Application No. PCT/JP2012/075395, mailed Dec. 18, 2012 (2 pages).

(Continued)

*Primary Examiner* — Duc C Ho
(74) *Attorney, Agent, or Firm* — Osha Liang LLP

(57) ABSTRACT

The present invention is designed to enable a radio base station apparatus to adequately estimate a coordinated cell to cause interference upon CoMP transmission, and effectively execute CoMP transmission. A radio communication system, according to the present invention, includes a plurality of radio base station apparatuses, and a user terminal (UE) that is configured to be able to perform coordinated multiple point transmission/reception with the plurality of radio base station apparatuses, where the user terminal (UE) has a transmission section that transmits information to use to estimate a candidate cell to be an interference cell upon coordinated multiple point transmission, and the radio base station apparatus has an estimation section that estimates a candidate cell to be an interference cell upon coordinated multiple point transmission based on the information.

11 Claims, 11 Drawing Sheets

(51) Int. Cl.
*H04J 11/00* (2006.01)
*H04B 7/02* (2006.01)
*H04B 7/06* (2006.01)
*H04W 72/12* (2009.01)

(56) References Cited

U.S. PATENT DOCUMENTS

| | | | |
|---|---|---|---|
| 2013/0021925 A1* | 1/2013 | Yin | H04B 7/024 370/252 |
| 2013/0021929 A1* | 1/2013 | Kim | H04B 7/024 370/252 |
| 2013/0077513 A1* | 3/2013 | Ng | H04B 7/024 370/252 |
| 2013/0083780 A1* | 4/2013 | Luo | H04W 72/0406 370/336 |
| 2013/0258992 A1* | 10/2013 | Seo | H04L 1/0026 370/329 |

OTHER PUBLICATIONS

Feng, M. et al.; " Enhanced Dynamic Cell Selection with Muting Scheme for DL CoMP in LTE-A;" Vehicular Technology Conference (VTC 2010-Spring), 2010 IEEE 71st, May 19, 2010 (5 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

RADIO COMMUNICATION SYSTEM, RADIO BASE STATION APPARATUS, USER TERMINAL AND RADIO COMMUNICATION METHOD

TECHNICAL FIELD

The present invention relates to a radio communication system, a radio base station apparatus, a user terminal and a radio communication method that are applicable to a cellular system and so on.

BACKGROUND ART

In the UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In the third-generation system, it is possible to achieve a transmission rate of maximum approximately 2 Mbps on the downlink by using a fixed band of approximately 5 MHz. In the LTE system, it is possible to achieve a transmission rate of about maximum 300 Mbps on the downlink and about 75 Mbps on the uplink by using a variable band which ranges from 1.4 MHz to 20 MHz. In the UMTS network, for the purpose of achieving further broadbandization and higher speed, successor systems of LTE have been under study as well (for example, LTE-Advanced (LTE-A)).

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

As a promising technique for further improving the system performance of the LTE system, there is inter-cell orthogonalization. For example, in the LTE-A system, intra-cell orthogonalization is made possible by orthogonal multiple access on both the uplink and the downlink. On the downlink, orthogonalization is provided between user terminal UEs (User Equipment) in the frequency domain. Between cells, like in W-CDMA, interference randomization by repeating one-cell frequency is fundamental.

In the 3GPP (3rd Generation Partnership Project), coordinated multiple-point transmission/reception (CoMP) technique is under study as a technique for realizing inter-cell orthogonalization. In this CoMP transmission/reception, a plurality of cells coordinate and perform signal processing for transmission and reception for one user terminal UE or for a plurality of user terminal UEs. For example, for the downlink, simultaneous transmission of a plurality of cells, and coordinated scheduling/beam forming, which adopt precoding, are under study. By adopting these CoMP transmission/reception techniques, improvement of throughput performance is expected, especially with respect to user terminal UEs located on cell edges.

Downlink CoMP transmission/reception includes coordinated scheduling/coordinated beamforming, and joint processing. Joint processing includes joint transmission to transmit shared data channels from a plurality of cells to one user terminal UE, and dynamic point selection (hereinafter referred to as "DPS") to select one cell dynamically and transmit a shared data channel. When CoMP transmission (DPS) is adopted, data transmission from a coordinated cell to cause interference is stopped, so that, in order to control CoMP transmission (DPS) effectively, it is necessary to adequately estimate, in a radio base station apparatus, a coordinated cell to cause interference upon CoMP transmission.

The present invention has been made in view of the above, and it is therefore an object of the present invention to provide a radio communication system, a radio base station apparatus, a user terminal and a radio communication method, whereby it is possible to estimate, in a radio base station apparatus, a coordinated cell to cause interference upon CoMP transmission, and execute CoMP transmission effectively.

Solution to Problem

A radio communication system according to the present invention is a radio communication system having a plurality of radio base station apparatuses and a user terminal that is configured to be able to perform coordinated multiple point transmission/reception with the plurality of radio base station apparatuses, and, in this radio communication system: the user terminal has a transmission section that transmits information to use to estimate a candidate cell to be an interference cell upon coordinated multiple point transmission; and the radio base station apparatus has an estimation section that estimates the candidate cell to be the interference cell upon coordinated multiple point transmission, based on the information.

A radio base station apparatus according to the present invention is a radio base station apparatus in a radio communication system including a plurality of radio base station apparatuses and a user terminal that is configured to be able to perform coordinated multiple point transmission/reception with the plurality of radio base station apparatuses, and this radio base station apparatus has an estimation section that estimates a candidate cell to be an interference cell upon coordinated multiple point transmission, based on information transmitted from the user terminal.

A user terminal according to the present invention is a user terminal in a radio communication system including a plurality of radio base station apparatuses and a user terminal that is configured to be able to perform coordinated multiple point transmission/reception with the plurality of radio base station apparatuses, and this user terminal has a transmission section that transmits information to use to estimate a candidate cell to be an interference cell upon coordinated multiple point transmission.

A radio communication method according to the present invention is a radio communication method in a radio communication system having a plurality of radio base station apparatuses and a user terminal that is configured to be able to perform coordinated multiple point transmission/reception with the plurality of radio base station apparatuses, and this radio communication method includes the steps of: at the user terminal, transmitting information to use to estimate a candidate cell to be an interference cell upon coordinated multiple point transmission; and at the radio base station apparatus, estimating the candidate cell to be the interference cell upon coordinated multiple point transmission based on the information.

Technical Advantage of the Invention

According to the present invention, it is possible to adequately estimate, in a radio base station apparatus, a coordinated cell to cause interference upon CoMP transmission, and execute CoMP transmission effectively.

DESCRIPTION OF EMBODIMENTS

An embodiment of the present invention will be described below in detail with reference to the accompanying drawings.

Figure 1A:
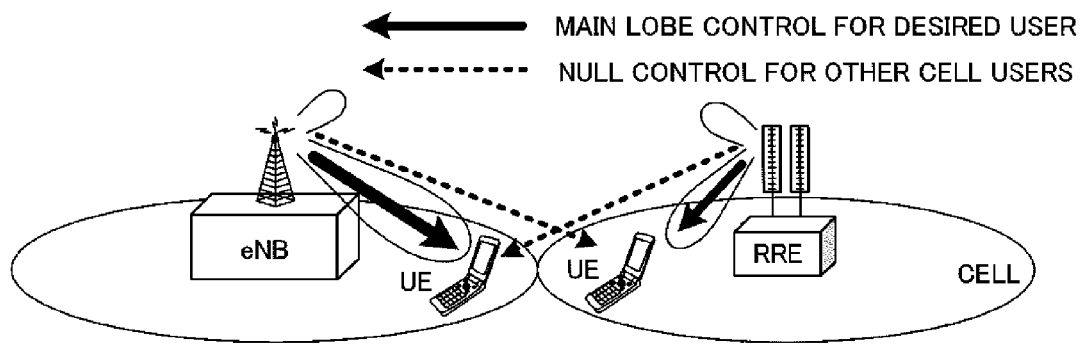
FIG. 1 provides diagrams to explain coordinated multiple point transmission.
Figure 1B:
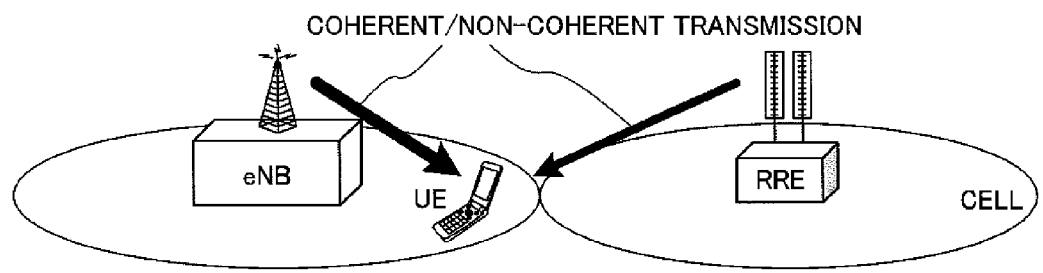
Figure 1C:
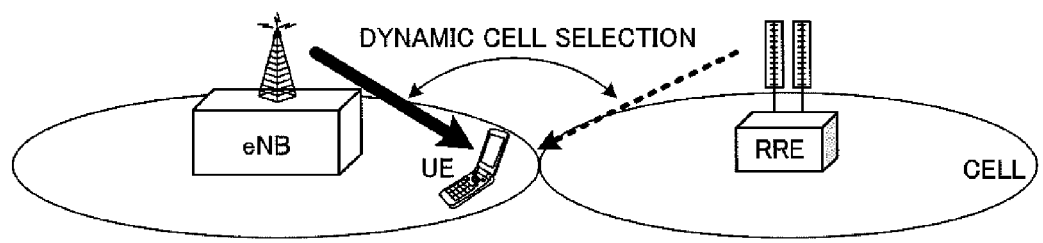

First, downlink CoMP transmission will be described using FIG. 1. Downlink CoMP transmission includes coordinated scheduling/coordinated beamforming, and joint processing. Coordinated scheduling/coordinated beamforming refers to a method of transmitting a shared data channel from only one cell to one user terminal UE, and allocates radio resources in the frequency/space domain, taking into account interference from other cells and interference against other cells, as shown in FIG. 1A. Joint processing refers to a method of simultaneously transmitting shared data channels from a plurality of cells by adopting precoding, and includes joint transmission to transmit from a plurality of cells to one user terminal UE, as shown in FIG. 1B, and dynamic point selection (DPS) to select one cell dynamically and transmit a shared data channel, as shown in FIG. 1C.

Figure 2A:
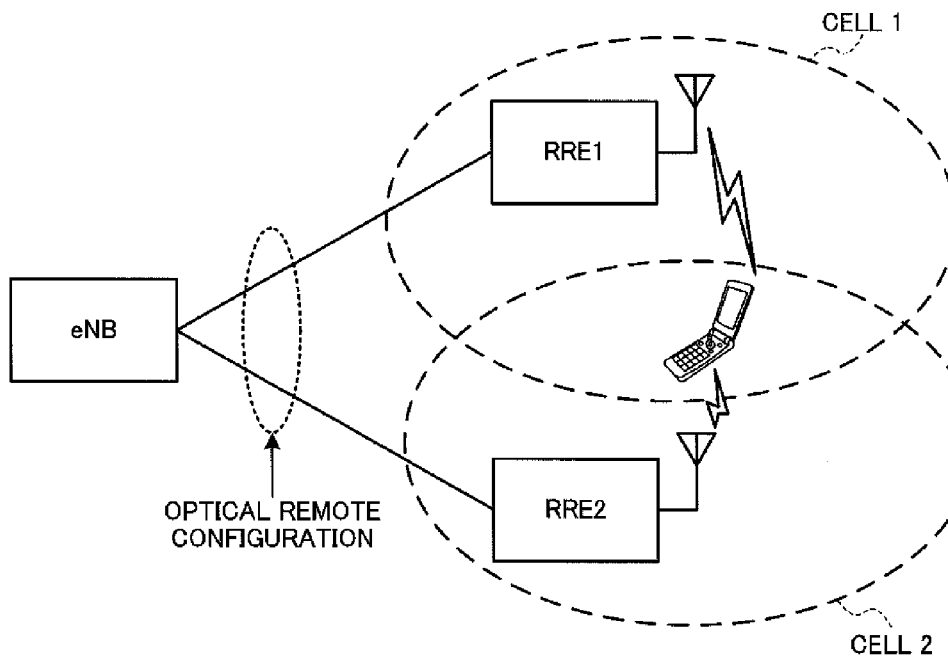
FIG. 2 provides schematic diagrams to show configurations of radio base station apparatuses that are adopted in coordinated multiple point transmission/reception.
Figure 2B:
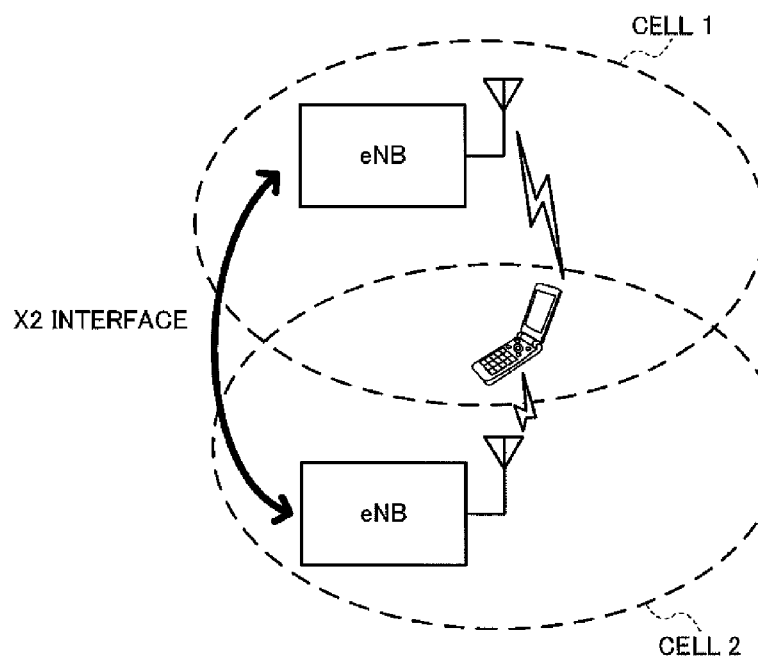

As a configuration to realize CoMP transmission/reception, there are, for example, a configuration (centralized control based on an RRE configuration) to include a plurality of remote radio equipment (RREs) that are connected to a radio base station apparatus (radio base station apparatus eNB) by optical fiber and so on, as shown in FIG. 2A, and a configuration (autonomous distributed control based on an independent base station configuration) of a radio base station apparatus (radio base station apparatus eNB), as shown in FIG. 2B. Although FIG. 2A shows a configuration to include a plurality of remote radio equipment RREs, it is equally possible to use a configuration to include only single remote radio equipment RRE, as shown in FIG. 1.

In the configuration shown in FIG. 2A (RRE configuration), remote radio equipment RRE 1 and RRE 2 are controlled in a centralized fashion in a radio base station apparatus eNB. In the RRE configuration, a radio base station apparatus eNB (centralized base station) that performs baseband signal processing and control for a plurality of remote radio equipment RREs, and each cell (that is, each remote radio equipment RRE), are connected by baseband signals using optical fiber, so that it is possible to execute radio resource control between the cells in the centralized base station altogether. That is, the problems of signaling delay and overhead between radio base station apparatus eNBs, which become problems in an independent base station configuration, are insignificant, and high-speed radio resource control between cells is relatively easy. In the RRE configuration, it is possible to adopt, on the downlink, a method to use fast signal processing between cells such as simultaneous transmission of a plurality of cells.

In the configuration shown in FIG. 2B (independent base station configuration), a plurality of radio base station apparatus eNBs (or RREs) each perform radio resource allocation control such as scheduling. In this case, by using the X2 interface between the radio base station apparatus eNB of the cell 1 and the radio base station apparatus eNB of the cell 2, radio resource allocation information such as timing information and scheduling is transmitted to one of the radio base station apparatus eNBs when necessary, thereby coordinating between the cells.

In the CoMP transmission (DPS) shown in FIG. 1C, the cell to transmit the shared data channel is dynamically selected based on channel quality information (CQI: Channel Quality Indicator) generated in the user terminal UE. By stopping transmission in the radio resources (resource block) of a coordinated cell to cause interference against the signal of the selected transmitting cell, it is possible to significantly improve the received SINR (Signal to Interference and Noise Ratio) of a user terminal UE on the cell boundary.

Figure 3:
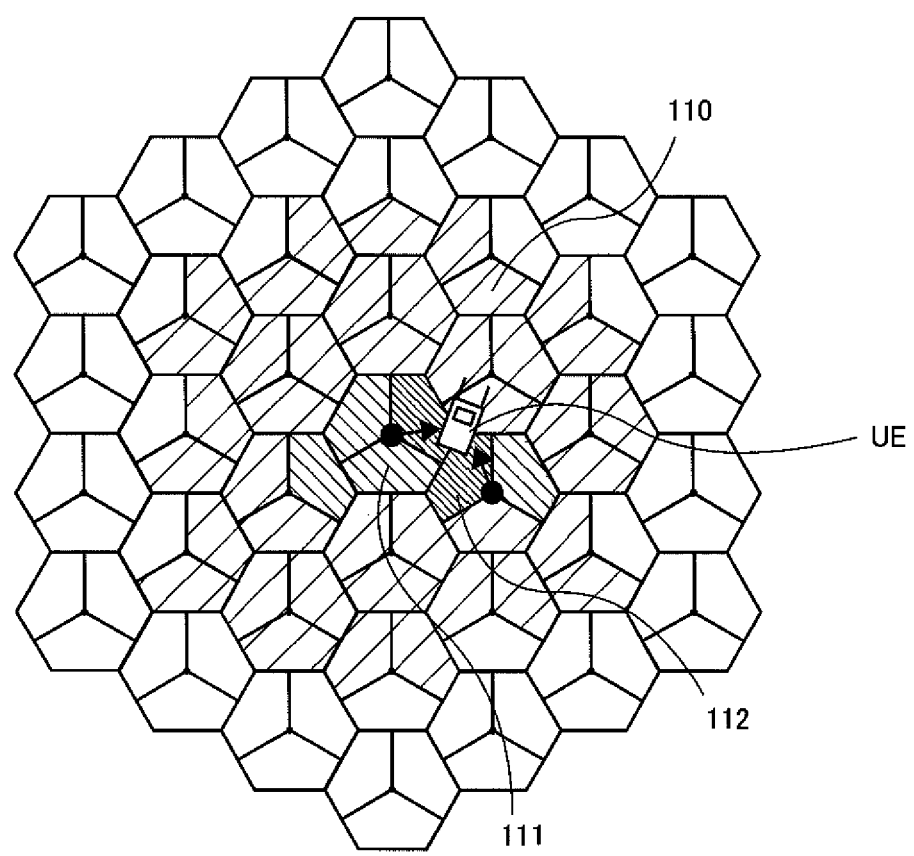
FIG. 3 is a schematic diagram to explain a cell structure of a radio communication system.

The method of determining the cell (CoMP transmission communicating cell) to transmit the shared data channel to a user terminal UE in CoMP transmission (DPS) will be described with reference to FIG. 3. FIG. 3 is a schematic diagram to explain a cell structure of a radio communication system.

First, the radio base station apparatus eNB of the serving cell reports measurement candidate cells (RRM measurement set) 110 to a user terminal UE by an RRC (Radio Resource Control) protocol control signal.

The user terminal UE measures the RSRP (Reference Signal Received Power)/RSRQ (Reference Signal Received Quality) based on the CRS (Cell-specific Reference Signals) or CSI-RS (Channel State Information Reference Signals) received from each measurement candidate cell 110. Then, the user terminal UE determines whether or not to request CoMP transmission (DPS), from the RSRP/RSRQ measurement results. Whether or not to request CoMP transmission (DPS) is determined based on, for example, whether or not the RSRPs/RSRQs of the surrounding cells exceed the RSRP/RSRQ of the serving cell, whether or not the RSRP/RSRQ of the serving cell falls below a threshold value, and so on. When the user terminal UE determines to request CoMP transmission (DPS) from the RSRP/RSRQ measurement results, the user terminal UE reports a measurement report result to the radio base station apparatus eNB by higher layer signaling (for example, RRC signaling), and requests CoMP transmission (DPS). Note that the content of the measurement report result transmitted from the user terminal UE to the radio base station apparatus eNB includes the RSPP/RSRQ of the serving cell and the RERPs/RSRQs of the surrounding cells.

The radio base station apparatus eNB designates channel quality measurement cells (CoMP measurement set) 111 among the measurement candidate cells 110, based on the measurement report result. Then, the radio base station apparatus eNB transmits a connection reconfiguration signal (RRC Connection Reconfiguration), which includes reporting of the channel quality measurement cells (CoMP measurement set) 111, to the user terminal UE, where CoMP transmission (DPS) should be applied.

In response to the connection reconfiguration signal from the radio base station apparatus eNB, the user terminal UE transmits a connection reconfiguration complete signal (RRC Connection Reconfiguration Complete) for reporting that the reporting of the channel quality measurement cells 111 has been received, to the radio base station apparatus eNB.

After that, the user terminal UE determines shared data channel non-transmission candidate cells to cause severe interference, among the channel quality measurement cells 111 reported from the radio base station apparatus eNB, and feeds back the CQIs to be given without transmission of the shared data channels from these cells, to the radio base station apparatus eNB, by the PUCCH (Physical Uplink Control Channel).

The radio base station apparatus eNB determines CoMP transmission communicating cells (CoMP transmission points) from the channel quality measurement cells based on the CQIs fed back from the user terminal UE.

As described above, in CoMP transmission (DPS), a user terminal UE determines shared data channel non-transmission candidate cells to cause severe interference, from the channel quality measurement cells 111 reported from the radio base station apparatus eNB, and feeds back the CQIs to be given without transmission of the shared data channels from these cells, to the radio base station apparatus eNB. However, the radio base station apparatus eNB is unable to estimate which cells, among the channel quality measurement cells 111, the user terminal UE has determined to be shared data channel non-transmission candidate cells and fed back the CQIs, and therefore there is a problem that it is not possible to adequately estimate coordinated cells to cause interference on the radio base station apparatus eNB side.

The present inventors have focused on this point and arrived at the present invention by finding out that, when CoMP transmission (DPS) is adopted, it is possible to adequately estimate coordinated cells to cause interference by enabling a radio base station apparatus eNB to estimate shared data channel non-transmission candidate cells.

That is to say, a gist of the present invention is that, when CoMP transmission (DPS) is adopted, a radio base station apparatus eNB adequately estimates a coordinated cell to cause interference upon CoMP transmission, based on information from a user terminal UE, and executes CoMP transmission adequately.

With the present invention, the information from a user terminal UE that is used when a radio base station apparatus eNB estimates a shared data channel non-transmission candidate cell (a cell that becomes an interference cell upon CoMP transmission) may include cell information (shared data channel non-transmission candidate cell information) from the user terminal UE, and a measurement report result. When the information from the user terminal UE is shared data channel non-transmission candidate cell information, the user terminal UE sends signaling to the radio base station apparatus eNB (method 1), and, when the information from the user terminal UE is a measurement report result, the radio base station apparatus eNB sends signaling to the user terminal UE (method 2).

When the information from the user terminal UE is shared data channel non-transmission candidate cell information, a method of signaling shared data channel non-transmission candidate cell information from the user terminal UE to the radio base station apparatus eNB by higher layer signaling using a measurement report result may be used (method 1-1), or a method of dynamically signaling shared data channel non-transmission candidate cell information from the user terminal UE to the radio base station apparatus eNB using channel quality information (CQI) (method 1-2) may be used.

When the information from the user terminal UE is a measurement report result, the radio base station apparatus eNB estimates shared data channel non-transmission candidate cells from the measurement report result transmitted from the user terminal UE, and signals this shared data channel non-transmission candidate cell information to the user terminal UE. This signaling may be higher layer signaling or may be dynamic signaling using the PDCCH.

(Method 1)

According to method 1, a radio base station apparatus eNB estimates shared data channel non-transmission candidate cells using shared data channel non-transmission candidate cell information that is signaled from a user terminal UE to the radio base station apparatus eNB. In this case, the shared data channel non-transmission candidate cell information from the user terminal UE is signaled by higher layer signaling using a measurement report result (method 1-1), or signaled dynamically using CQI feedback (method 1-2).

(Method 1-1)

Figure 4:
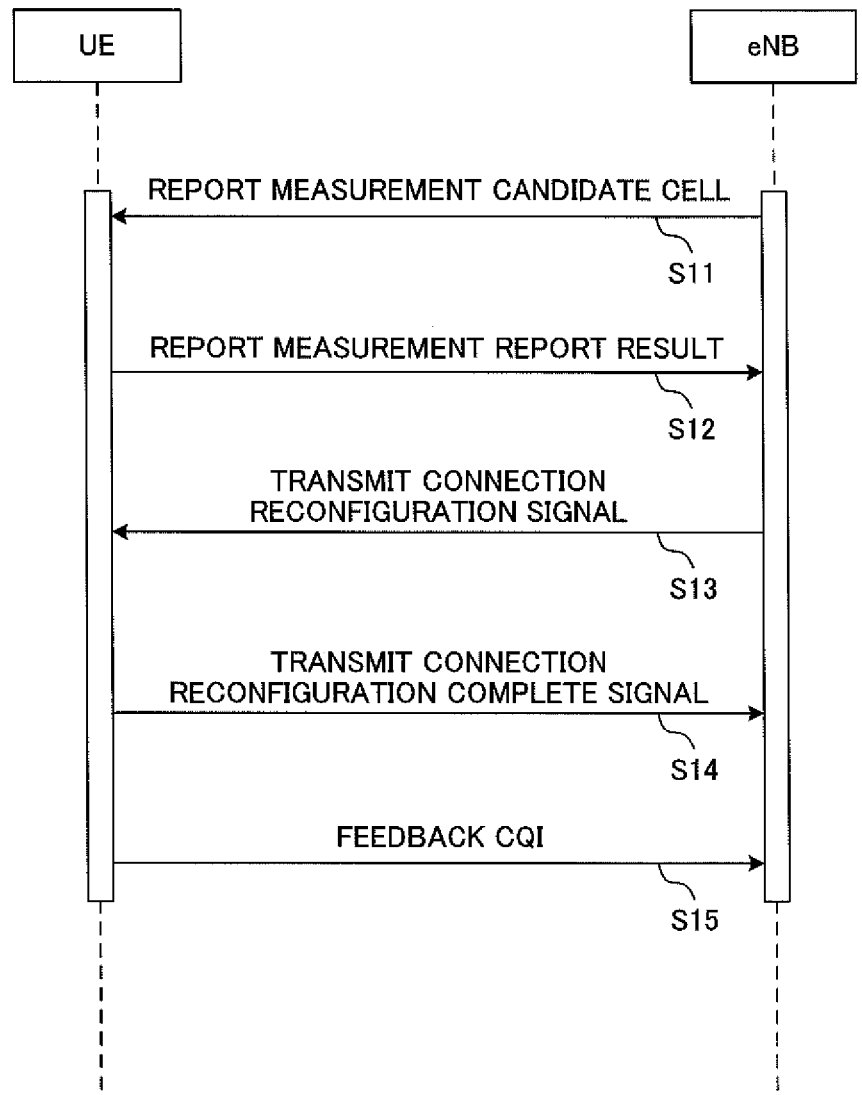
FIG. 4 is a sequence diagram of CoMP transmission (DPS)

The method of determining CoMP transmission communicating cells 112 when a user terminal UE signals shared data channel non-transmission candidate cell information to a radio base station apparatus eNB by higher layer signaling using a measurement report result, will be described with reference to FIG. 3 and FIG. 4. FIG. 4 is a sequence diagram of CoMP transmission (DPS).

First, the radio base station apparatus eNB of the serving cell reports measurement candidate cells 110 to the user terminal UE by an RRC protocol control signal (S11).

The user terminal UE measures the RSRP/RSRQ based on the CRS or the CSI-RS received from each measurement candidate cell 110. Then, the user terminal UE determines whether or not to request CoMP transmission (DPS) based on the RSRP/RSRQ measurement results, and also estimates shared data channel non-transmission candidate cells that are likely to cause severe interference. A shared data channel non-transmission candidate cell is estimated based on, for example, whether or not the RSRP/RSRQ of the cell exceeds the RSRP/RSRQ of the serving cell, or whether or not the RSRP/RSRQ of the cell exceeds a threshold value.

When the user terminal UE determines to request CoMP transmission (DPS) from the RSRP/RSRQ measurement results, the user terminal UE reports shared data channel non-transmission candidate cell information to the radio base station apparatus eNB by higher layer signaling (for example, RRC signaling), with a measurement report result (S12).

The radio base station apparatus eNB designates channel quality measurement cells 111 among the measurement candidate cells 110, based on the measurement report result and the shared data channel non-transmission candidate cell information. At this time, the radio base station apparatus eNB designates the channel quality measurement cells 111 so as not to include, for example, shared data channel non-transmission candidate cells, by taking into account the shared data non-transmission candidate cell information from the user terminal UE. Then, the radio base station apparatus eNB transmits a connection reconfiguration signal, which includes reporting of the channel quality measurement cells 111, to the user terminal UE where CoMP transmission (DPS) should be applied (S13).

In response to the connection reconfiguration signal from the radio base station apparatus eNB, the user terminal UE transmits a connection reconfiguration complete signal for reporting that the reporting of the channel quality measurement cells 111 has been received, to the radio base station apparatus eNB (S14).

After that, the user terminal UE determines the shared data channel non-transmission candidate cells to cause severe interference, among the channel quality measurement cells 111 reported from the radio base station apparatus eNB, and feeds back the CQIs to be given without transmission of the shared data channels from these cells, to the radio base station apparatus eNB, by the PUCCH (S15).

The radio base station apparatus eNB determines the CoMP transmission communicating cells 112 from among the channel quality measurement cells 111, based on the CQIs fed back from the user terminal UE.

In this way, when a user terminal UE signals shared data channel non-transmission candidate cell information to a radio base station apparatus eNB using a measurement report result, the radio base station apparatus eNB is able to estimate shared data channel non-transmission candidate cells to cause severe interference, based on the information from the user terminal UE, in the stage of designating the channel quality measurement cells 111. Consequently, it is possible to adequately estimate coordinated cells to cause interference upon CoMP transmission (DPS), and execute CoMP transmission effectively.

(Method 1-2)

Figure 5:
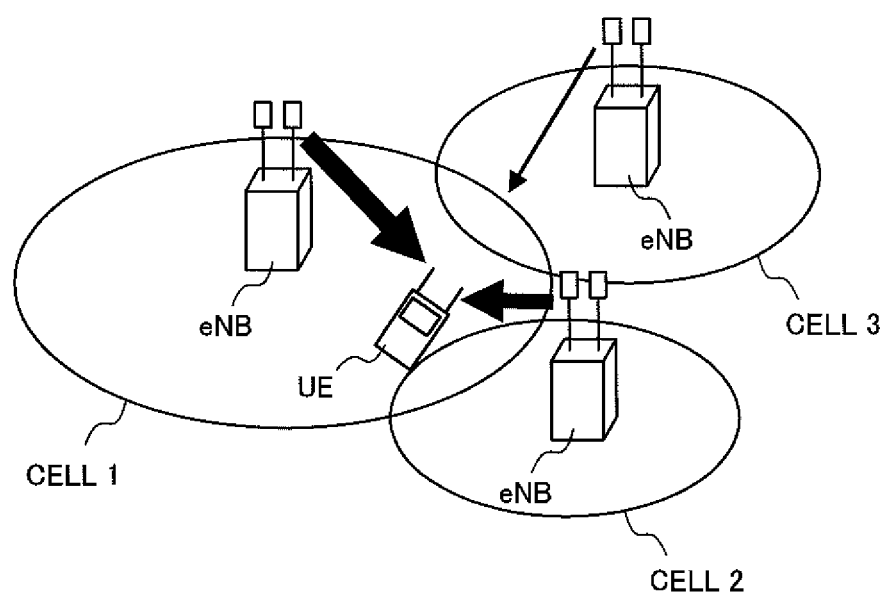
FIG. 5 is a schematic diagram to show a cell structure of a channel quality measurement cell in CoMP transmission (DPS)

The method whereby a user terminal UE determines CoMP transmission communicating cells 112 when shared data channel non-transmission candidate cell information is dynamically signaled to a radio base station apparatus eNB using CQI feedback, will be described with reference to FIG. 3 to FIG. 5. FIG. 5 is a schematic diagram to show a cell structure of channel quality measurement cells in CoMP transmission (DPS). In FIG. 5, the cell 1 is the serving cell and the cells 2 and 3 are surrounding cells.

First, the radio base station apparatus eNB of the serving cell reports measurement candidate cells 110 to a user terminal UE by an RRC protocol control signal (S11).

The user terminal UE measures the RSRP/RSRQ based on the CRS or the CSI-RS received from each measurement candidate cell 110. Then, when the user terminal UE determines to request CoMP transmission (DPS) from the RSRP/RSRQ measurement results, the user terminal UE reports a measurement report result to the radio base station apparatus eNB by higher layer signaling (for example, RRC signaling) (S12).

The radio base station apparatus eNB designates the channel quality measurement cells 111 among the measurement candidate cells 110 based on the measurement report result. Then, the radio base station apparatus eNB transmits a connection reconfiguration signal, which includes reporting of the channel quality measurement cells 111, to the user terminal UE where CoMP transmission (DPS) should be applied (S13).

In response to the connection reconfiguration signal from the radio base station apparatus eNB, the user terminal UE transmits a connection reconfiguration complete signal for reporting that the reporting of the channel quality measurement cells 111 has been received, to the radio base station apparatus eNB (S14).

After that, the user terminal UE measures the CQIs in the channel quality measurement cells 111 reported from the radio base station apparatus eNB, and determines the shared data channel non-transmission candidate cells to cause severe interference. Then, the CQIs to be given when the shared data channel non-transmission candidate cells are made not subject to transmission are fed back to the radio base station apparatus eNB, using the PUCCH (S15), and also the shared data channel non-transmission candidate cell information is signaled to the radio base station apparatus eNB by the PUCCH.

For example, upon measuring the CQI of the cell 1 shown in FIG. 5, the user terminal UE measures the CQI in the following four patterns: (1) when the shared data channels from the cells 2 and 3 are transmitted, (2) when the shared data channel from the cell 2 is not transmitted, (3) when the shared data channel from the cell 3 is not transmitted, and (4) when the shared data channels from the cells 2 and 3 are not transmitted. The user terminal UE measures the four patterns of CQIs in the same way with respect to the cells 2 and 3 as well. Then, from all the measured CQIs, the user terminal UE determines the CQI of the highest communication quality—that is, the CQI to be given when the shared data channels from shared data channel non-transmission candidate cells to cause severe interference are made not subject to transmission. For example, when the CQI of above (2) is the CQI of the highest communication quality, if the cell 1 is the serving cell, it is possible to determine that the cell 2 is a shared data channel non-transmission candidate cell to cause severe interference. In this case, the user terminal UE feeds back the CQI of above (2) (the CQI when the cell 1 is the serving cell and the shared data channel from the cell 2 is not transmitted) to the radio base station apparatus eNB, and signals cell information (for example, bitmap information) indicating the cell 2, which is a shared data channel non-transmission candidate cell, to the radio base station apparatus eNB.

The radio base station apparatus eNB determines the CoMP transmission communicating cells 112 to transmit the shared data channels to the user terminal UE, from among the channel quality measurement cells 111, based on the CQIs and the shared data channel non-transmission candidate cell information fed back from the user terminal UE.

When a user terminal UE signals shared data channel non-transmission candidate cell information to a radio base station apparatus eNB using CQI feedback, the radio base station apparatus eNB determines the shared data channel non-transmission candidate cells with high accuracy, based on the information from the user terminal UE. It is possible adequately estimate coordinated cells to cause interference upon CoMP transmission (DPS), and execute CoMP transmission effectively.

The radio base station apparatus eNB, to which the user terminal UE signals shared data channel non-transmission candidate cell as the destination, may be a regular macro base station or may be a low transmission power base station (for example, a phantom cell). It is equally possible to provide a configuration in which a low transmission power base station (for example, a phantom cell), to which the shared data channel non-transmission candidate cells are reported from a user terminal UE, reports the reported shared data channel non-transmission candidate cells to a macro base station.

(Method 2)

According to method 2, a radio base station apparatus eNB estimates shared data channel non-transmission candidate cells from a measurement report result transmitted from a user terminal UE to the radio base station apparatus eNB, and signals this shared data channel non-transmission candidate cell information to the user terminal UE. In this case, the method of determining the CoMP transmission communicating cells 112 will be described with reference to FIG. 3 to FIG. 5.

First, the radio base station apparatus eNB of the serving cell reports the measurement candidate cells 110 to a user terminal UE by an RRC protocol control signal (S11).

The user terminal UE measures the RSRP/RSRQ based on the CRS or CSI-RS received from each measurement candidate cell 110. Then, when the user terminal UE determines to request CoMP transmission (DPS) from the RSRP/RSRQ measurement results, the user terminal UE reports a measurement report result to the radio base station apparatus eNB by higher layer signaling (for example, RRC signaling) (S12).

The radio base station apparatus eNB designates the channel quality measurement cells 111 among the measurement candidate cells 110, based on the measurement report result (RSRP/RSRQ), and also estimates the shared data channel non-transmission candidate cells. Then, the radio base station apparatus eNB transmits a connection reconfiguration signal, which includes reporting of the channel quality measurement cells 111, to the user terminal UE where CoMP transmission (DPS) should be applied (S13), and also signals the shared data channel non-transmission candidate cell information to the user terminal UE.

The method of estimating the shared data channel non-transmission candidate cells in the radio base station apparatus eNB will be described with reference to FIG. 5. When, according to the measurement report result from the user terminal UE, the received level (RSRP/RSRQ) of each cell is given such that cell 1 (serving cell)>cell 2>cell 3, the radio base station apparatus eNB estimates that the cell 2 is a shared data channel non-transmission candidate cell.

After that, the radio base station apparatus eNB signals the user terminal UE to feed back the CQI to be given when the cell 2 is made a shared data channel non-transmission candidate cell. The shared data channel non-transmission candidate cell information is signaled semi-statically by higher layer signaling (for example, RRC signaling), or is signaled dynamically using the PDCCH.

In response to the connection reconfiguration signal from the radio base station apparatus eNB, the user terminal UE transmits a connection reconfiguration complete signal for reporting that the reporting of the channel quality measurement cells 111 has been received, to the radio base station apparatus eNB (S14).

After that, the user terminal UE measures the CQIs in the channel quality measurement cells 111 reported from the radio base station apparatus eNB. At this time, the user terminal UE measures the CQIs to be given when the shared data channel non-transmission candidate cells designated from the radio base station apparatus eNB are made not subject to transmission. Then, the user terminal UE feeds back the measured CQIs to the radio base station apparatus eNB by the PUCCH (S15).

The radio base station apparatus eNB determines the CoMP transmission communicating cells 112 to transmit the shared data channels to the user terminal UE, from among the channel quality measurement cells 111, based on the CQIs fed back from the user terminal UE.

When a radio base station apparatus eNB estimates shared data channel non-transmission candidate cells from a measurement report result sent from a user terminal UE and signals this shared data channel non-transmission candidate cell information to the user terminal UE, it is possible to reduce the overhead of CQIs to be fed back from the user terminal UE, so that it is possible to reduce the amount of signals. Since the radio base station apparatus eNB estimates the shared data channel non-transmission candidate cells from the measurement report result sent from the user terminal UE, it is possible to adequately estimate coordinated cells to cause interference upon CoMP transmission (DPS), and execute CoMP transmission effectively.

When a radio base station apparatus eNB signals shared data channel non-transmission candidate cells to a user terminal UE, it may be possible to report the shared data channel non-transmission candidate cells from a regular macro base station to the user terminal UE, or report the shared data channel non-transmission candidate cells from a low transmission power base station (for example, a phantom cell) to the user terminal UE. When the shared data channel non-transmission candidate cells are reported from a low transmission power base station (for example, a phantom cell) to the user terminal UE, a configuration to report the shared data channel non-transmission candidate cells from a macro base station to the low transmission power base station (for example, a phantom cell) in advance may be used.

Figure 6:
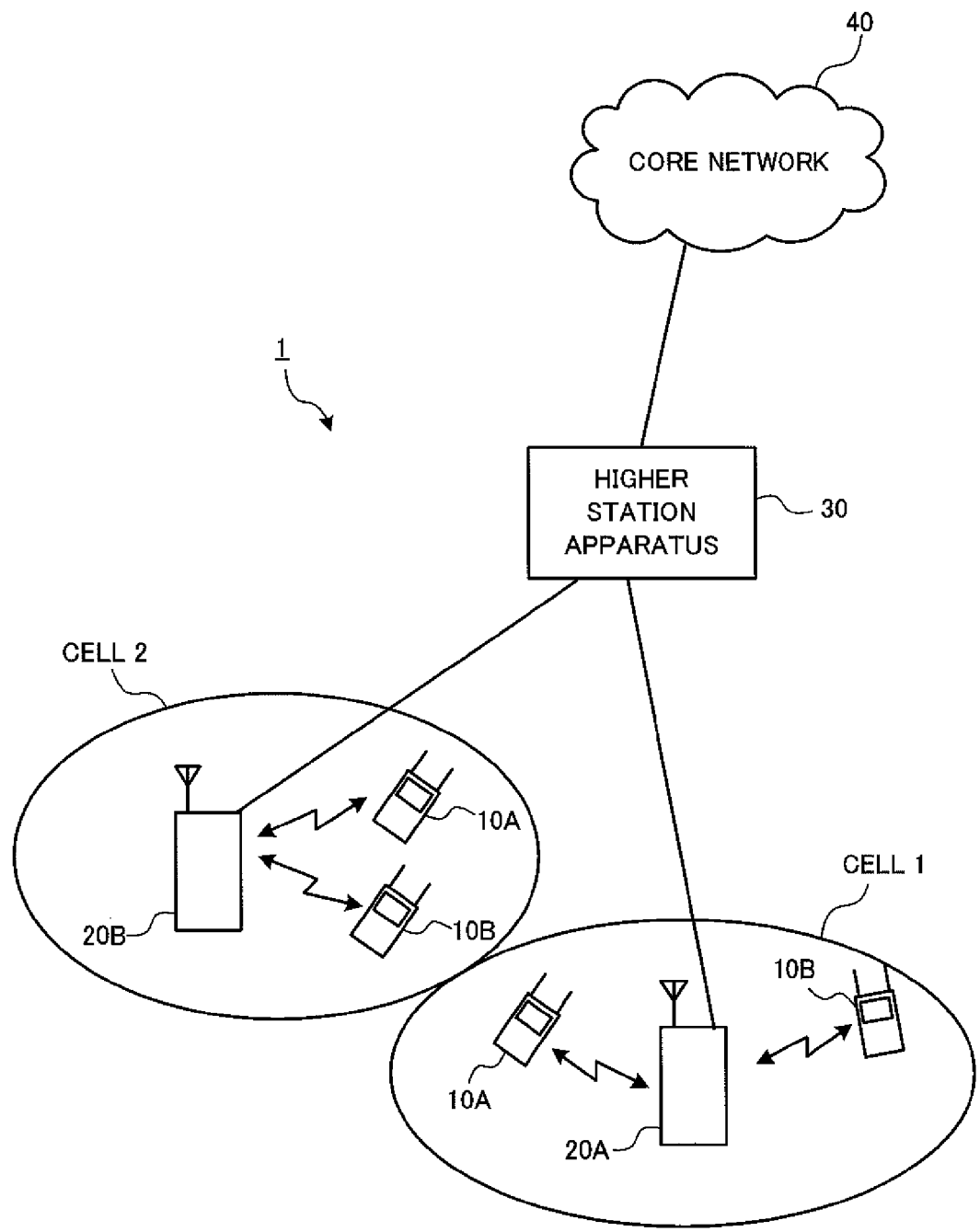
FIG. 6 is a diagram to explain a system configuration of a radio communication system.

An embodiment of the present invention will be described below in detail. FIG. 6 is a diagram to explain a system configuration of a radio communication system according to the present embodiment. The radio communication system shown in FIG. 6 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as "IMT-Advanced" or may be referred to as "4G."

As shown in FIG. 6, a radio communication system 1 is configured to include radio base station apparatuses 20A and 20B, and a plurality of the first and second user terminals 10A and 10B that communicate with the radio base station apparatuses 20A and 20B. The radio base station apparatuses 20A and 20B are connected with a higher station apparatus 30, and this higher station apparatus 30 is connected with a core network 40. The radio base station apparatuses 20A and 20B are mutually connected by wire connection or by wireless connection. The first and second user terminals 10A and 10B are able to communicate with the radio base station apparatuses 20A and 20B in cells 1 and 2. The higher station apparatus 30 includes, for example, an access gateway apparatus, a radio network controller (RNC), a mobility management entity (MME) and so on, but is by no means limited to these.

Although the first and second user terminals 10A and 10B may be either LTE terminals or LTE-A terminals, the following description will be given simply with respect to the first and second user terminals 10A and 10B, unless specified otherwise. Although, for ease of explanation, the radio base station apparatuses 20A and 20B and the first and second user terminals 10A and 10B, which are mobile terminal apparatuses, will be described to perform radio communication, more generally, the first and second user terminals 10A and 10B may be user apparatuses including fixed terminal apparatuses.

In the radio communication system 1, as radio access schemes, OFDMA (Orthogonal Frequency Division Multiple Access) is applied to the downlink, and SC-FDMA (Single- Carrier-Frequency-Division Multiple Access) is applied to the uplink, but the radio access schemes are not limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. The downlink communication channels include a PDSCH (Physical Downlink Shared Channel), which is used by the first and second user terminals 10A and 10B as a downlink data channel on a shared basis, and downlink L1/L2 control channels (PDCCH, PCFICH, and PHICH). Transmission data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

The uplink communication channels include a PUSCH, which is an uplink data channel used by the user terminals 10A and 10B on a shared basis, and a PUCCH, which is an uplink control channel. By means of this PUSCH, transmission data and higher control information are transmitted. By means of the PUCCH, downlink radio quality information (CQI: Channel Quality Indicator), ACK/NACK and so on are transmitted.

Now, referring to FIG. 7, an overall configuration of a radio base station apparatus according to the present embodiment will be explained. The radio base station apparatuses 20A and 20B have the same configuration and therefore will be described simply as "radio base station apparatus 20." The first and second user terminals 10A and 10B have the same configuration and therefore will be described simply as "user terminal 10." The radio base station apparatus 20 has transmitting/receiving antennas 201a and 201b, amplifying sections 202a and 202b, transmitting/receiving sections 203a and 203b, a baseband signal processing section 204, a call processing section 205, and a transmission path interface 206. Transmission data to be transmitted from the radio base station apparatus 20 to the user terminal 10 on the downlink is input from the higher station apparatus 30, into the baseband signal processing section 204, via the transmission path interface 206.

In the baseband signal processing section 204, a downlink data channel signal is subjected to PDCP layer processes, division and coupling of transmission data, RLC (Radio Link Control) layer transmission processes such as an RLC retransmission control transmission process, MAC (Medium Access Control) retransmission control, including, for example, a HARQ transmission process, scheduling, transport format selection, channel coding, an inverse fast Fourier transform (IFFT) process, and a precoding process. As for the signal of the physical downlink control channel, which is a downlink control channel, transmission processes such as channel coding and an inverse fast Fourier transform are performed.

The baseband signal processing section 204 reports control information for allowing each user terminal 10 to perform radio communication with the radio base station apparatus 20, to the user terminals 10 connected to the same cell, by a broadcast channel. Information for communication in the cell includes, for example, the system bandwidth on the uplink and the downlink, identification information of a root sequence (root sequence index) for generating signals of random access preambles of the PRACH (Physical Random Access Channel), and so on.

Baseband signals that are output from the baseband signal processing section 204 are converted into a radio frequency band in the transmitting/receiving sections 203a and 203b. The amplifying sections 202a and 202b amplify the radio frequency signals having been subjected to frequency conversion, and output the results to the transmitting/receiving antennas 201a and 201b.

As for signals to be transmitted from the user terminal 10 to the radio base station apparatus 20 on the uplink, radio frequency signals that are received in the transmitting/receiving antennas 201 are amplified in the amplifying sections 202a and 202b, converted into baseband signals by frequency conversion in the transmitting/receiving sections 203a and 203b, and input in the baseband signal processing section 204.

The baseband signal processing section 204 applies an FFT process, an IDFT process, error correction decoding, a MAC retransmission control receiving process, and RLC layer and PDCP layer receiving processes, to the transmission data included in a baseband signal that is received on the uplink. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Next, referring to FIG. 8, an overall configuration of a user terminal according to the present embodiment will be described. An LTE terminal and an LTE-A terminal have the same hardware configurations in principle parts, and therefore will be described indiscriminately. A user terminal 10 has a transmitting/receiving antenna 101, an amplifying section 102, a transmitting/receiving section 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. In the downlink data, broadcast information is also transferred to the application section 105.

Uplink transmission data is input from the application section 105 to the baseband signal processing section 104. In the baseband signal processing section 104, a mapping process, a retransmission control (HARQ) transmission process, channel coding, a DFT process, and an IFFT process are performed. The baseband signal output from the baseband signal processing section 104 is converted into a radio frequency band in the transmitting/receiving section 103. After that, the radio frequency signal having been subjected to frequency conversion is amplified in the amplifying section 102 and transmitted from the transmitting/receiving antenna 101.

The function blocks of a radio base station apparatus will be described with reference to FIG. 9. The radio base station apparatus shown in FIG. 9 has a centralized control-type radio base station configuration. In the event of centralized control, a given radio base station apparatus (centralized radio base station apparatus, which is the cell 1 in FIG. 9) executes radio resource allocation control such as scheduling, altogether, and a serving radio base station apparatus (remote radio equipment, which is the cell 2 in FIG. 9) follows the radio resource allocation result by the radio base station apparatus. In this case, feedback information (CQI) is used as necessary information for radio resource allocation between a plurality of cells and so on, in the user scheduling control section 921 of the radio base station apparatus.

Figure 7:
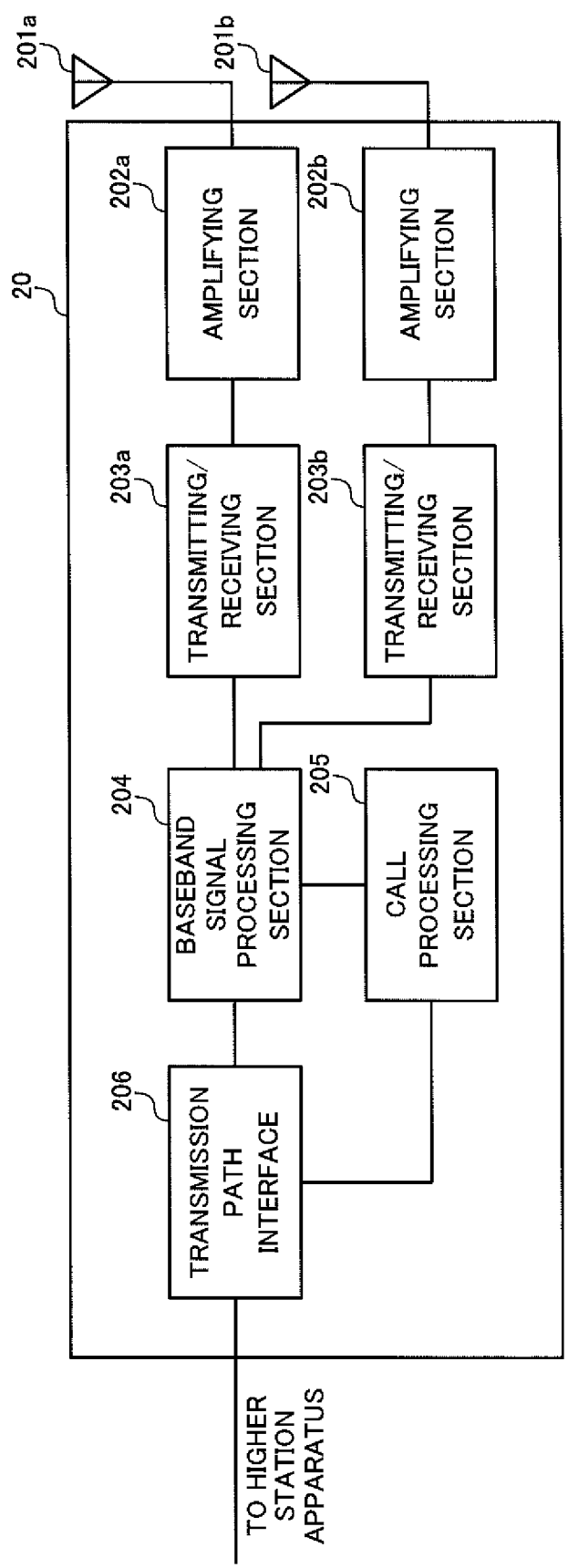
FIG. 7 is a block diagram to show an overall configuration of a radio base station apparatus.
Figure 9:
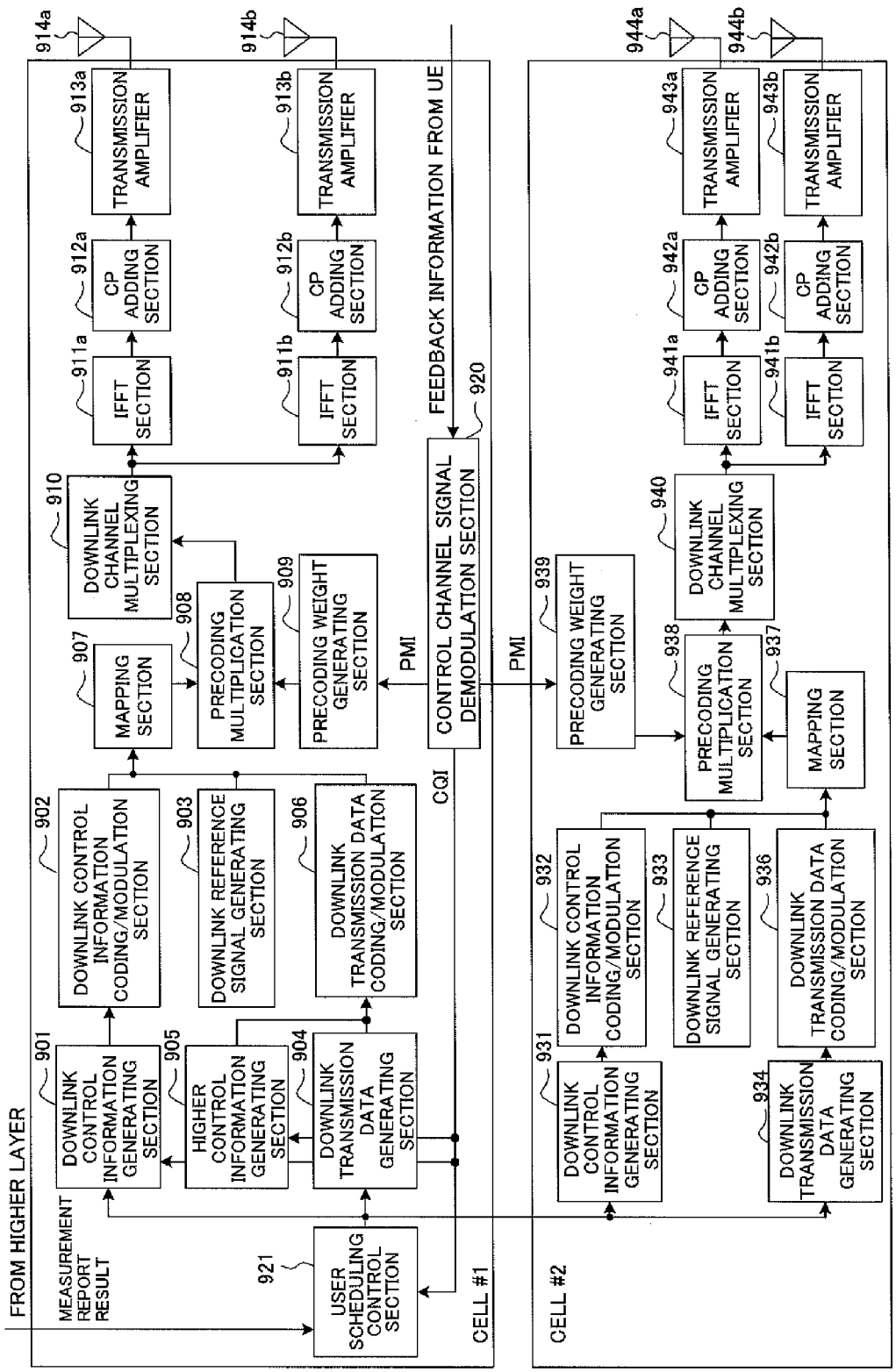
FIG. 9 is a block diagram to show a configuration of a baseband processing section in a centralized control-type radio base station apparatus.

The function blocks of FIG. 9 primarily relate to the processing content of the baseband processing section 204 shown in FIG. 7. Also, the function blocks shown in FIG. 9 are simplified to explain the present invention, and assumed to have the configurations which a baseband processing section 204 should normally have.

The transmission section on the centralized radio base station apparatus (the cell 1) side has a downlink control information generating section 901, a downlink control information coding/modulation section 902, a downlink reference signal generating section 903, a downlink transmission data generating section 904, a higher control information generating section 905 and a downlink transmission data coding/modulation section 906. The transmission section on the centralized radio base station apparatus (the cell 1) side has a mapping section 907, a precoding multiplication section 908, a precoding weight generating section 909, a downlink channel multiplexing section 910, IFFT sections 911 (911*a* and 911*b*), CP adding sections 912 (912*a* and 912*b*), transmission amplifiers 913 (913*a* and 913*b*), transmitting antennas 914 (914*a* and 914*b*), a control channel signal demodulation section 920, and a user scheduling control section 921. The transmission amplifiers 913 and transmitting antennas 914 correspond to the amplifying sections 202 and transmitting/receiving antennas 201 shown in FIG. 7, respectively.

The transmission section on the serving cell remote radio equipment (the cell 2) side has a downlink control information generating section 931, a downlink control information coding/modulation section 932, a downlink reference signal generating section 933, a downlink transmission data generating section 934, and a downlink transmission data coding/modulation section 936. The transmission section on the serving cell remote radio equipment (the cell 2) side has a mapping section 937, a precoding multiplication section 938, a precoding weight generating section 939, a downlink channel multiplexing section 940, IFFT sections 941*a* and 941*b*, CP adding sections 942*a* and 942*b*, transmission amplifiers 943*a* and 943*b*, and transmitting antennas 944*a* and 944*b*. The centralized radio base station apparatus and the remote radio equipment of the serving cell are connected by, for example, optical fiber.

The downlink control information generating sections 901 and 931 each generate downlink control information in accordance with control by the user scheduling control section 921, and output that downlink control information to the downlink control information coding/modulation sections 902 and 932, respectively. The downlink control information coding/modulation sections 902 and 932 perform channel coding and data modulation for the downlink control information, and output the results to the mapping sections 907 and 937, respectively.

The downlink reference signal generating sections 903 and 933 generate downlink reference signals (CRS, CSI-RS and DM-RS), and outputs these downlink reference signals to the mapping sections 907 and 937, respectively. The downlink transmission data generating sections 904 and 934 generate downlink transmission data, and output this downlink transmission data to the downlink transmission data coding/modulation sections 906 and 936, respectively.

The higher control information generating section 905 generates higher control information to be transmitted and received by higher layer signaling (for example, RRC signaling), and outputs the generated higher control information to the downlink transmission data coding/modulation section 906. For example, the higher control information generating section 905 generates higher control information, which includes the measurement candidate cells, channel quality measurement cells and CoMP transmission communicating cells, for the user terminal 10.

The downlink transmission data coding/modulation section 906 performs channel coding and data modulation with respect to the downlink transmission data and the higher control information, and outputs the results to the mapping section 907. The downlink transmission data coding/modulation section 936 performs channel coding and data modulation with respect to the downlink transmission data, and outputs the result to the mapping section 937.

The mapping sections 907 and 937 map the downlink control information, downlink reference signals, downlink transmission data and higher control information, and output these to the precoding multiplication sections 908 and 938, respectively.

The precoding weight generating sections 909 and 939 generate precoding weights based on the PMIs fed back from the user terminal 10, and output the precoding weights to the precoding multiplication sections 908 and 938, respectively. To be more specific, the precoding weight generating sections 909 and 939 each have a codebook and select a precoding weight corresponding to the PMI from the codebook. Note that the PMIs to be utilized in the precoding weight generating sections 909 and 939 are given from the control channel signal demodulation section 920.

The precoding multiplication sections 908 and 938 multiply transmission signals by the precoding weights. That is to say, the precoding multiplication sections 908 and 938 apply a phase shift and/or an amplitude shift, for each of the transmitting antennas 914*a* and 914*b* and the transmitting antennas 944*a* and 944*b*, based on the precoding weights provided from the precoding weight generating sections 909 and 939. The precoding multiplication sections 908 and 938 output the transmission signals, to which a phase shift and/or an amplitude shift has been applied, to the downlink channel multiplexing sections 910 and 940, respectively.

The downlink channel multiplexing sections 910 and 940 combine the downlink control information, downlink reference signals, higher control information and downlink transmission data, to which a phase shift and/or an amplitude shift has been applied, and generate transmission signals for each of the transmitting antennas 914*a* and 914*b* and the transmitting antennas 944*a* and 944*b*. The downlink channel multiplexing sections 910 and 940 output the transmission signals to the IFFT (Inverse Fast Fourier Transform) sections 911*a* and 911*b* and the IFFT sections 941*a* and 941*b*, respectively.

The IFFT sections 911*a* and 911*b* and the IFFT sections 941*a* and 941*b* perform an IFFT of the transmission signals, and output the transmission signals after the IFFT to the CP adding sections 912*a* and 912*b* and the CP adding sections 942*a* and 942*b*. The CP adding sections 912*a* and 912*b* and the CP adding sections 942*a* and 942*b* add CPs (Cyclic Prefixes) to the transmission signals after the IFFT, and output the transmission signals, to which CPs have been added, to the transmission amplifiers 913*a* and 913*b* and the transmission amplifiers 943*a* and 943*b*, respectively.

The transmission amplifiers 913*a* and 913*b* and the transmission amplifiers 943*a* and 943*b* amplify the transmission signals, to which CPs have been added. The amplified transmission signals are transmitted to the user terminal 10, from the transmitting antennas 914*a* and 914*b* and the transmitting antennas 944*a* and 944*b*, on the downlink, respectively.

The control channel signal demodulation section 920 demodulates the control channel signal reported from the user terminal 10 by the PUCCH, outputs the PMIs included in the control channel signal to the precoding weight generating sections 909 and 939, and outputs the CQIs to the user scheduling control section 921. Note that, when the CQIs are reported by the PUSCH, an uplink data channel demodulation section, which is not shown, demodulates the uplink transmission data, and output the CQIs included in the uplink transmission data to the user scheduling control section 921.

A measurement report result (RSRP/RSRQ) is reported from a higher layer to the user scheduling control section 921. The user scheduling control section 921 determines the CoMP transmission communicating cells to transmit the shared data channels to the user terminal 10 and the coordinated cells to stop data transmission, based on the CQIs, when CoMP transmission (DPS) is adopted.

A radio communication system adopting a system of the above configuration will be described. When method 1 is adopted, first, in the higher control information generation section 905, higher control information, which includes reporting of the measurement candidate cells for the user terminal 10, is generated. The measurement report result (RSRP/RSRQ) from the user terminal 10 is reported from the higher layer to the user scheduling control section 921. When method 1-1 is adopted, shared data channel non-transmission candidate cell information is reported to the user scheduling control section 921, with a measurement report result.

Based on the measurement report result, the higher control information generating section 905 generates a higher control signal, which includes reporting of the channel quality measurement cells for the user terminal 10. The CQIs from the user terminal 10 are demodulated in the control channel signal demodulation section 920 and reported to the user scheduling control section 921. When method 1-2 is adopted, shared data channel non-transmission candidate cell information is reported to the user scheduling control section 921 with the CQIs.

Based on the CQIs fed back from the user terminal 10, the higher control information generating section 905 generates a higher control signal, including reporting of the CoMP transmission communicating cells for the user terminal 10.

When method 2 is adopted, first, the higher control information generating section 905 generates higher control information, which includes reporting of the measurement candidate cells for the user terminal 10. The measurement report result (RSRP/RSRQ) from the user terminal 10 is reported from a higher layer to the user scheduling control section 921. The higher control information generating section 905 estimates the shared data channel non-transmission candidate cells based on the measurement report result.

Based on the measurement report result, the higher control information generating section 905 generates a higher control signal, which includes reporting of the channel quality measurement cells, for the user terminal 10. The CQIs from the user terminal 10 are demodulated in the control channel signal demodulation section 920 and reported to the user scheduling control section 921.

Based on the CQIs fed back from the user terminal 10, the higher control information generating section 905 generates a higher control signal, which includes reporting of the CoMP transmission communicating cells, for the user terminal 10.

Now, the function blocks of a radio base station apparatus having a different configuration from the radio base station apparatus shown in FIG. 9 will be described with reference to FIG. 10. The radio base station apparatus shown in FIG. 10 has an autonomous distributed control-type radio base station configuration. In the event of autonomous distributed control, a plurality of radio base station apparatuses each execute radio resource allocation control such as scheduling. In this case, the feedback information (CQI) is used as information that is necessary for radio resource allocation and so on in the user scheduling control sections 921 and 951, in each of the plurality of radio base station apparatuses.

Figure 10:
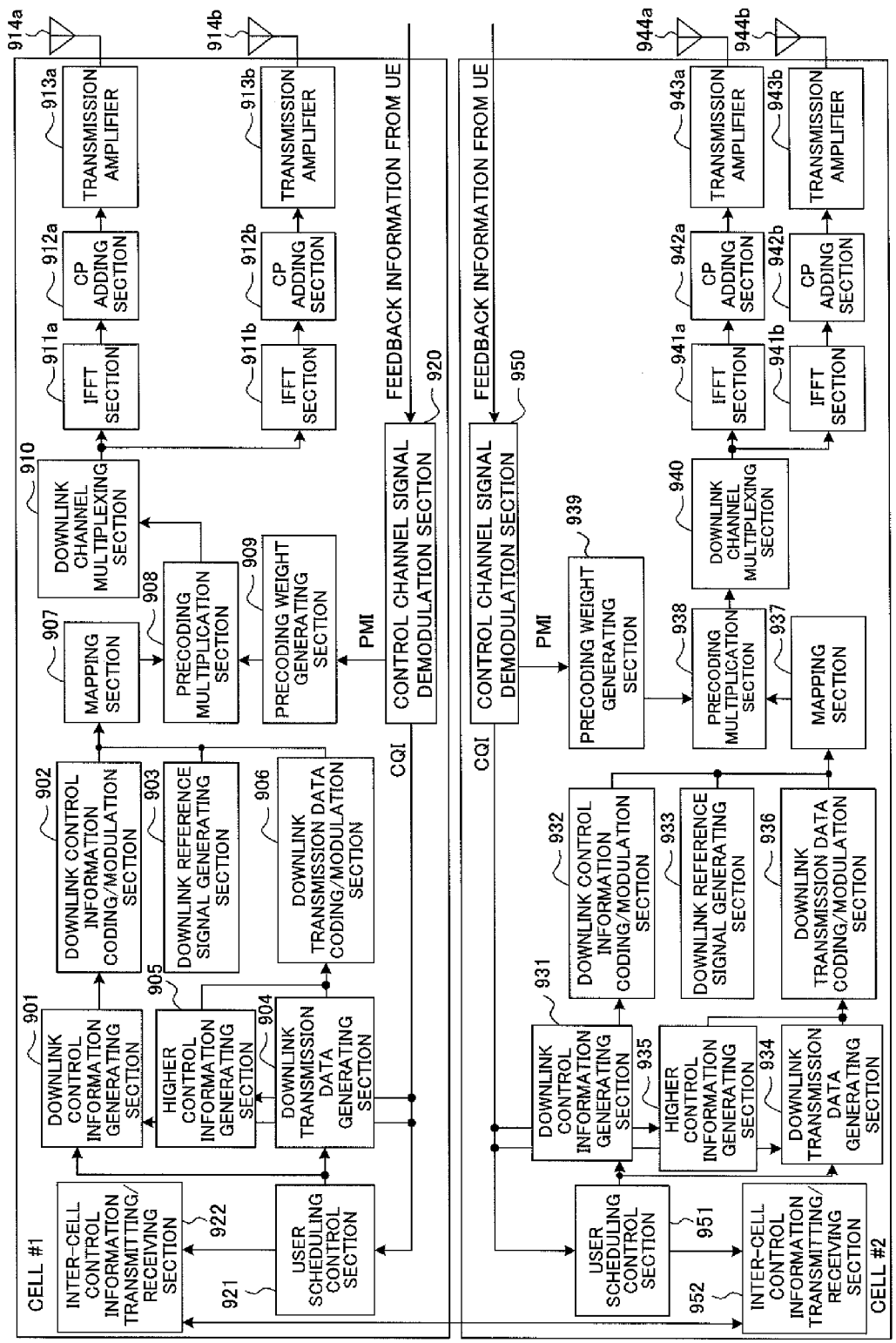
FIG. 10 is a block diagram to show a configuration of a baseband processing section in an autonomous distributed control-type radio base station apparatus.

The function blocks of FIG. 10 primarily relate to the processing content of the baseband processing section 204 shown in FIG. 7. The function blocks shown in FIG. 10 are simplified to explain the present invention, and assumed to have the configurations which a baseband processing section 204 should normally have. Function blocks in FIG. 10 that are the same as in FIG. 9 will be assigned the same codes as in FIG. 9, and their detailed descriptions will be omitted.

The transmission section on the cell 1 side has a downlink control information generating section 901, a downlink control information coding/modulation section 902, a downlink reference signal generating section 903, a downlink transmission data generating section 904, a higher control information generating section 905, a downlink transmission data coding/modulation section 906, a mapping section 907, a precoding multiplication section 908, a precoding weight generating section 909, a downlink channel multiplexing section 910, IFFT sections 911*a* and 911*b*, CP adding sections 912*a* and 912*b*, transmission amplifiers 913*a* and 913*b*, transmitting antennas 914*a* and 914*b*, a control channel signal demodulation section 920, a user scheduling control section 921, and an inter-cell control information transmitting/receiving section 922.

The transmission section on the cell 2 side similarly has a downlink control information generating section 931, a downlink control information coding/modulation section 932, a downlink reference signal generating section 933, a downlink transmission data generating section 934, a higher control information generating section 935, a downlink transmission data coding/modulation section 936, a mapping section 937, a precoding multiplication section 938, a precoding weight generating section 939, a downlink channel multiplexing section 940, IFFT sections 941*a* and 941*b*, CP adding sections 942*a* and 942*b*, transmission amplifiers 943*a* and 943*b*, transmitting antennas 944*a* and 944*b*, a control channel signal demodulation section 950, a user scheduling control section 951, and an inter-cell control information transmitting/receiving section 952.

The functions of the higher control information generating section 935, the control channel signal demodulation section 950 and the user scheduling control section 952 provided in the transmission section of the cell 2 side are the same as the functions of the higher control information generating section 905, the control channel signal demodulation section 920 and the user scheduling control section 921 provided in the transmission section of the cell 1 side, respectively.

That is to say, the higher control information generating section 935 generates higher control information to be transmitted and received by higher layer signaling (for example, RRC signaling), and outputs the generated higher control information to the downlink transmission data coding/modulation section 936. The downlink transmission data coding/modulation section 936 performs channel coding and data modulation for the downlink transmission data and the higher control information, and outputs the results to the mapping section 937.

Also, the control channel signal demodulation section 950 demodulates the control channel signal reported from the user terminal 10 by the PUCCH, outputs the PMIs included in the control channel signal to the precoding weight generating section 939, and outputs the CQIs to the user scheduling control section 951. Note that, when the CQIs are reported by the PUSCH, an uplink data channel demodulation section, which is not shown, demodulates the uplink transmission data, and outputs the CQIs included in the uplink transmission data, to the user scheduling control section 951. The user scheduling control section 951 executes scheduling control for the downlink control information of the target cell, based on the CQIs.

The inter-cell control information transmitting/receiving sections 922 and 952 are connected by an X2 interface, and transmit and receive, with each other, the timing information, scheduling information and so on that are output from the user scheduling control sections 921 and 951. By this means, coordination between cells is made possible.

Figure 11:
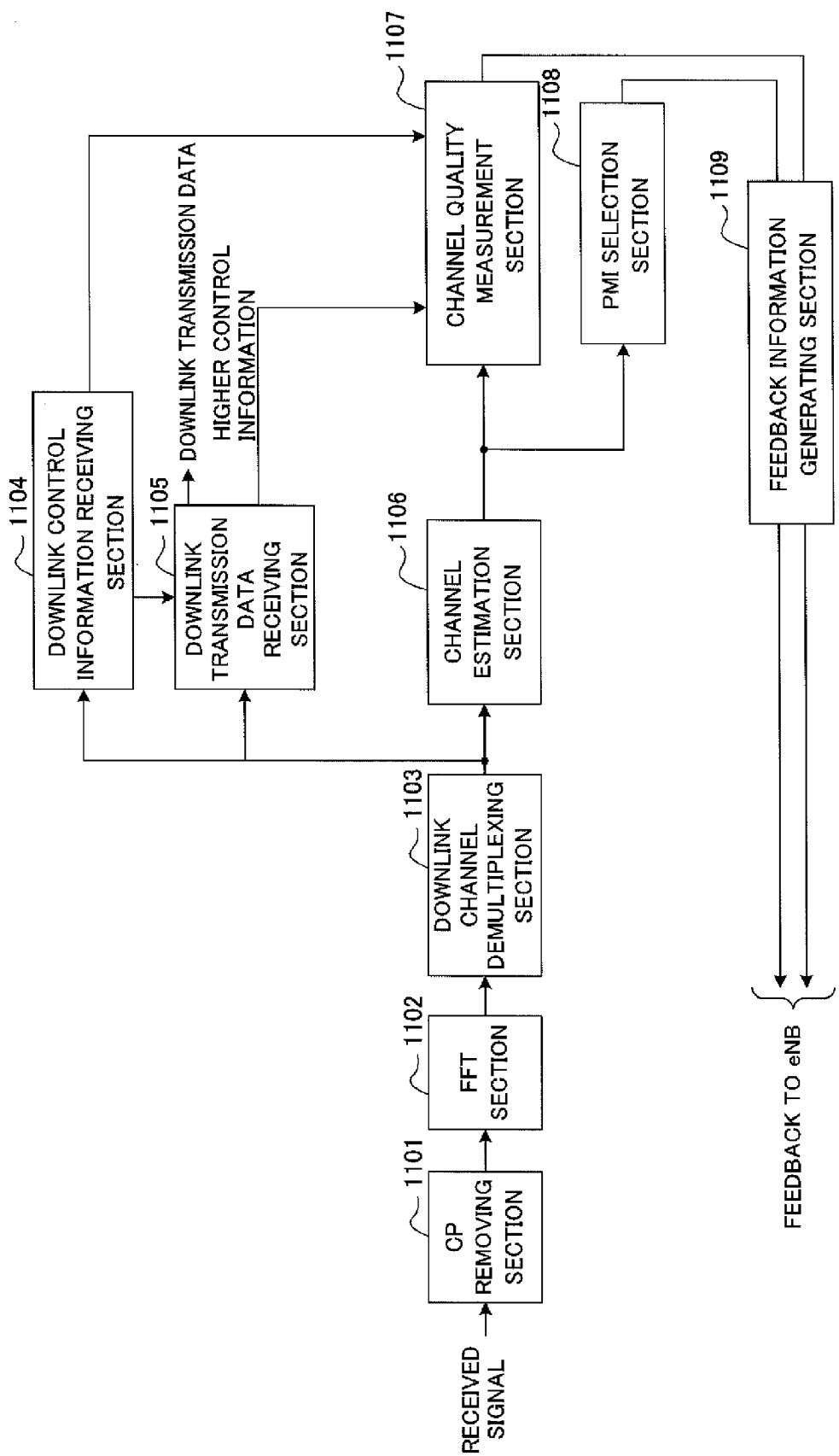
FIG. 11 is a block diagram to show a configuration of a baseband signal processing section in a user terminal.

The function blocks of a user terminal will be described with reference to FIG. 11. Note that the function blocks of FIG. 11 primarily relate to the processing content of the baseband signal processing section 104 shown in FIG. 8. Also, the function blocks shown in FIG. 11 are simplified to explain the present invention, and assumed to have the configurations which a baseband processing section should normally have.

The receiving section of the user terminal has a CP removing section 1101, an FFT section 1102, a downlink channel demultiplexing section 1103, a downlink control information receiving section 1104, a downlink transmission data receiving section 1105, a channel estimation section 1106, a channel quality measurement section 1107, a PMI selection section 1108, and a feedback information generating section 1109. The channel quality measurement section 1107 functions as a channel state information generating section.

Figure 8:
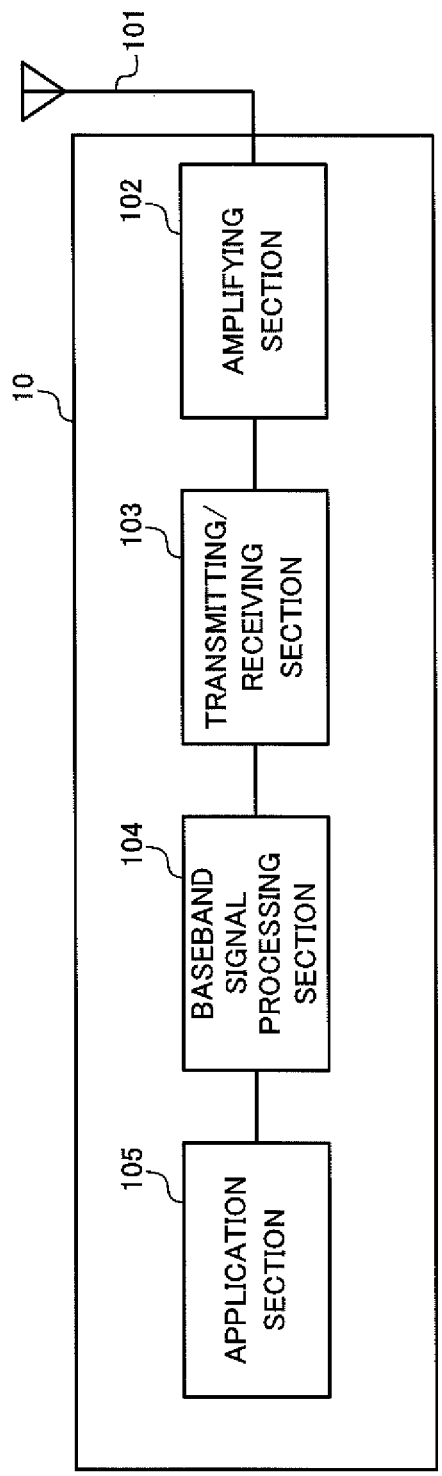
FIG. 8 is a block diagram to show an overall configuration of a user terminal.

A transmission signal that is transmitted from the radio base station apparatus eNB is received by the transmitting/receiving antenna 101 shown in FIG. 8, and output to the CP removing section 1101. The CP removing section 1101 removes the CPs from the received signal, and outputs the result to the FFT section 1102. The FFT section 1102 performs a fast Fourier transform (FFT) of the signal, from which the CPs have been removed, and converts the time domain signal into a frequency domain signal. The FFT section 1102 outputs the signal having been converted into a frequency domain signal, to the downlink channel demultiplexing section 1103. The downlink channel demultiplexing section 1103 demultiplexes the downlink channel signal into downlink control information, downlink transmission data, higher control information and downlink reference signal. The downlink channel demultiplexing section 1103 outputs the downlink control information to the downlink control information receiving section 1104, outputs the downlink transmission data and the higher control information to the downlink transmission data receiving section 1105, and outputs the downlink reference signal to the channel estimation section 1106.

The downlink control information receiving section 1104 demodulates the downlink control information, and outputs the demodulated control information to the downlink transmission data receiving section 1105. Also, the downlink control information receiving section 1104 demodulates the control channel signal (for example, the PDCCH) included in the downlink control information. The downlink transmission data receiving section 1105 demodulates the downlink transmission data using the control information. Also, the downlink transmission data receiving section 1105 demodulates the higher control information included in the downlink transmission data and reports the result to the channel quality measurement section 1107. The channel estimation section 1106 estimates the channel state using the downlink reference signal, and outputs the estimated channel state to the channel quality measurement section 1107 and the PMI selection section 1108.

The channel quality measurement section 1107 measures the RSRP/RSRQ and CQI from the channel state reported from the channel estimation section 1106, based on the higher control information reported from the downlink transmission data receiving section 1105. The RSRP/RSRQ and CQI measured in the channel quality measurement section 1107 are output to the feedback information generating section 1109 as feedback information.

The PMI selection section 1108 selects a PMI from the channel state reported from the channel estimation section 1106 using a codebook. The PMI selected in the PMI selection section 1108 is output to the feedback information generating section 1109 as feedback information.

The feedback information generating section 1109 feeds back the RSRP/RSRQ and CQI measured in the channel quality measurement section 1107 to the radio base station apparatus 20 as feedback information.

A radio communication system adopting a system of the above configuration will be described. When method 1 is adopted, the channel quality measurement section 1107 measures the RSRP/RSRQ in each cell, among the measurement candidate cells reported from the radio base station apparatus 20 as a higher control signal, and outputs the results to the feedback information generating section 1109.

When method 1-1 is adopted, the feedback information generating section 1109 estimates shared data channel non-transmission candidate cells that are likely to cause severe interference. The feedback information generating section 1109 feeds back a measurement report result and shared data channel non-transmission candidate cell information to the radio base station apparatus 20 as feedback information. Then, in the user terminal 10, the channel quality measurement section 1107 measures the CQIs in the channel quality measurement cells reported from radio base station apparatus 20 as higher control information, and outputs the measured CQIs to the feedback information generating section 1109. The feedback information generating section 1109 determines the CQI of the highest communication quality and feeds back this CQI to the radio base station apparatus 20 as feedback information.

When method 1-2 is adopted, the feedback information generating section 1109 feeds back a measurement report result to the radio base station apparatus 20 as feedback information. Then, in the user terminal 10, the channel quality measurement section 1107 measures the CQIs in the channel quality measurement cells reported from the radio base station apparatus 20 as higher control information, and outputs shared data channel non-transmission candidate cell information to the feedback information generating section 1109, with the measured CQIs. The feedback information generating section 1109 also determines this CQI of the highest communication quality, and feeds back the CQI and the shared data channel non-transmission candidate cell information to the radio base station apparatus 20 as feedback information.

When method 2 is adopted, the channel quality measurement section 1107 measures the RSRP/RSRQ in each cell, among the measurement candidate cells reported as a higher control signal from the radio base station apparatus 20, and outputs the results to the feedback information generating section 1109. The feedback information generating section 1109 feeds back a measurement report result to the radio base station apparatus 20 as feedback information. Then, in the user terminal 10, the channel quality measurement section 1107 measures the CQIs in the channel quality measurement cells reported from the radio base station apparatus 20 by a higher control signal. At this time, the CQIs are measured by making the shared data channel non-transmission candidate cell that are reported by the higher control signal or the control channel signal not subject to transmission, and the measured CQIs are output to the feedback information generating section 1109. The feedback information generating section 1109 feeds back the CQIs to the radio base station apparatus 20 as feedback information.

The present invention is not limited to the descriptions contained herein, and can be implemented with various changes. For example, although modes to signal feedback information from a user terminal UE using CQIs have been described as examples herein, it is equally possible to use other information as long as shared data channel non-transmission candidate cells can be specified in a radio base station apparatus eNB. For example, it is possible to use the ratio $(S_1/S_2)$ of the received signal component $(S_1)$ from the cell 1, which is the serving cell, and the received signal component $(S_2)$ from the cell 2, which is a coordinated cell. Also, for example, the relationships of connection between elements, the functions of elements and so on shown herein can be implemented with various changes. Also, the configuration shown herein can be implemented in various combinations. Besides, the present invention can be changed with various changes without departing from the spirit of the present invention.

The disclosure of Japanese Patent Application No. 2011-226733, filed on Oct. 14, 2011, including the specification, drawings and abstract, is incorporated herein by reference in its entirety.

The invention claimed is:

1. A radio communication system comprising a plurality of radio base station apparatuses and a user terminal that is configured to be able to perform coordinated multiple point transmission/reception with the plurality of radio base station apparatuses, wherein:
the user terminal comprises a transmission section that transmits information to use to estimate a candidate cell to be an interference cell upon coordinated multiple point transmission; and
one of the plurality of radio base station apparatuses comprises an estimation section that estimates a shared data channel non-transmission candidate cell based on the information.

2. The radio communication system according to claim 1, wherein the information is shared data channel non-transmission candidate cell information.

3. The radio communication system according to claim 2, wherein the user terminal transmits the shared data channel non-transmission candidate cell information to the radio base station apparatus by higher layer signaling, using a measurement report.

4. The radio communication system according to claim 2, wherein the user terminal dynamically transmits the shared data channel non-transmission candidate cell information to the radio base station apparatus, using feedback of channel quality information.

5. The radio communication system according to claim 1, wherein the information is a measurement report result.

6. The radio communication system according to claim 5, wherein the radio base station apparatus estimates a shared data channel non-transmission candidate cell using the measurement report result.

7. The radio communication system according to claim 6, wherein the radio base station apparatus transmits information about the shared data channel non-transmission candidate cell to the user terminal by higher layer signaling.

8. The radio communication system according to claim 6, wherein the radio base station apparatus transmits information about the shared data channel non-transmission candidate cell to the user terminal by dynamic signaling using a downlink control channel.

9. A radio base station apparatus in a radio communication system comprising a plurality of radio base station apparatuses and a user terminal that is configured to be able to perform coordinated multiple point transmission/reception with the plurality of radio base station apparatuses,
wherein one of the plurality of radio base station apparatuses comprises an estimation section that estimates a shared data channel non-transmission candidate cell based on information transmitted from the user terminal.

10. A user terminal in a radio communication system comprising a plurality of radio base station apparatuses and a user terminal that is configured to be able to perform coordinated multiple point transmission/reception with the plurality of radio base station apparatuses,
wherein the user terminal comprises a transmission section that transmits information to use to estimate a candidate cell to be an interference cell upon coordinated multiple point transmission, and the information is used to estimate a shared data channel non-transmission candidate cell in one of the plurality of radio base station apparatuses.

11. A radio communication method in a radio communication system comprising a plurality of radio base station apparatuses and a user terminal that is configured to be able to perform coordinated multiple point transmission/reception with the plurality of radio base station apparatuses, the radio communication method comprising the steps of:
at the user terminal, transmitting information to use to estimate a candidate cell to be an interference cell upon coordinated multiple point transmission; and
at one of the plurality of radio base station apparatuses, estimating a shared data channel non-transmission candidate cell based on the information.

* * * * *